(12) United States Patent
Huber (10) Patent No.: US 7,972,410 B1
(45) Date of Patent: Jul. 5, 2011

(54) MAGNETIC AGGLOMERATION METHOD FOR SIZE CONTROL IN THE SYNTHESIS OF MAGNETIC NANOPARTICLES

(75) Inventor: Dale L. Huber, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 391 days.

(21) Appl. No.: 12/364,261

(22) Filed: Feb. 2, 2009

(51) Int. Cl.
*B22F 9/24* (2006.01)
(52) U.S. Cl. .............................. 75/347; 75/371; 977/896
(58) Field of Classification Search ................... 75/347, 75/371; 977/896
See application file for complete search history.

(56) References Cited

U.S. PATENT DOCUMENTS

| | | | |
|---|---|---|---|
| 6,302,940 B2 | 10/2001 | Murray et al. | |
| 6,676,729 B2 | 1/2004 | Sun | |
| 7,186,398 B2 * | 3/2007 | Andres et al. | 424/9.1 |
| 2004/0086885 A1 * | 5/2004 | Lee et al. | 435/6 |
| 2010/0104514 A1 * | 4/2010 | Brougham et al. | 424/9.3 |

OTHER PUBLICATIONS

Kim, D.K. et al., "Synthesis and characterization of surfactant-coated superparamagnetic monodispersed iron oxide nanoparticles", Journal of Magnetism and Magnetic Materials, vol. 225, pp. 30-36, 2001.*
Tartaj, P. et al., "The preparation of magnetic nanoparticles for applications in biomedicine", Journal of Physics D: Applied Physics, vol. 36, pp. R182-R197, Published Jun. 18, 2003.*
Huber, D.L. et al, "Synthesis of highly magnetic iron nanoparticles suitable for field structuring using a β-diketone surfactant", Journal of Magnetism and Magnet Materials, vol. 278, (2004), pp. 311-316.
James E. Martin, et al, "Giant matnetic susceptibility enhancement in field-structured nanocomposites", Journal of Magnetism and Magnet Materials, vol. 320, (2008), pp. 2221-2227.

* cited by examiner

*Primary Examiner* — George Wyszomierski
(74) *Attorney, Agent, or Firm* — Carol Ashby (57) ABSTRACT

A method for controlling the size of chemically synthesized magnetic nanoparticles that employs magnetic interaction between particles to control particle size and does not rely on conventional kinetic control of the reaction to control particle size. The particles are caused to reversibly agglomerate and precipitate from solution; the size at which this occurs can be well controlled to provide a very narrow particle size distribution. The size of particles is controllable by the size of the surfactant employed in the process; controlling the size of the surfactant allows magnetic control of the agglomeration and precipitation processes. Agglomeration is used to effectively stop particle growth to provide a very narrow range of particle sizes.

19 Claims, 12 Drawing Sheets

MAGNETIC AGGLOMERATION METHOD FOR SIZE CONTROL IN THE SYNTHESIS OF MAGNETIC NANOPARTICLES

The United States Government has rights in this invention pursuant to Department of Energy Contract No. DE-AC04-94AL85000 with Sandia Corporation.

BACKGROUND OF THE INVENTION

This invention relates to a method of controlling the size of magnetic nanoparticles.

For many applications, it is highly desirable to have magnetic nanoparticles whose sizes are all within a very limited range (substantially monodisperse). For some applications, it is desirable to employ nanoparticles that are sufficiently small that they can support only a single magnetic domain state. It would be very convenient to be able to manufacture such particles using chemical reactions in solution using a continuous reactor system.

Size control is very important in the synthesis of nanoparticles, and several methods have been developed to provide size control. These methods generally rely upon controlling the kinetics of the reaction to yield particles of a desired size. Examples include high-temperature nucleation to produce a number of stable nuclei, followed by low-temperature growth, where very few new nuclei are produced but materials is deposited on the previously formed nuclei. Deposition of material onto a fixed number of nuclei where additional nuclei are not being continuously formed can be used to produce particles that are relatively monodisperse in size.

However, because the sizes of the particles are controlled by reaction kinetics, such reactions are difficult to replicate in reactors with different heat and mass transport properties. This makes the scale-up of such reaction very challenging when using different sizes of reactor and different methods of temperature control or stirring. The ability to control the size of nanoparticles without relying on the heating profile or agitation level of a reaction would be highly desirable.

One example of a conventional approach is reported in Murray et al. ("Chemical Synthesis of Monodisperse and Magnetic Alloy Nanocrystal Containing Thin Films" U.S. Pat. No. 6,302,940). This reports a process based on a combination of reduction of metal salt and decomposition of neutral organometallic precursor for the formation of magnetic alloy nanoparticles. They report in situ reduction of $Pt(acac)_2$ (acac=acetylactonate) by long chain diol and decomposition of $Fe(CO)_5$ at a high temperature (260-300° C.) solution phase to yield high quality nanoparticles. The reduction of the metal salt by diol and the decomposition of the organometallic compound do not occur until the temperature is greater than 180° C. The particles are protected from agglomeration by a combination of long chain carboxylic acid, such as oleic acid, and long chain primary amine, such as oleyl amine. Long aliphatic chains of oleic acid present a significant steric barrier for strong interactions between the particles, and magnetic exchange coupling between the particles is eliminated completely by the physical separation induced. This stabilization is so effective that the particles can be handled easily either in solution phase or as a solid form under air. The particles can be easily dispersed in alkane and chlorinated solvents and purified by precipitation through the addition of alcohol. Their method of forming magnetic alloy nanoparticles includes forming a metal salt solution with a reducing agent and stabilizing ligands, introducing an organometallic compound into the metal salt solution to form a mixture, heating the mixtures, and adding a flocculent to cause the magnetic alloy nanoparticles to precipitate out of the mixture without permanent agglomeration.

Another example of controlling the size of nanoparticles using kinetic control is described in D. L. Huber, E. K. Venturini, J. E. Martin, P. P. Provencio, and R. J. Patel, "Synthesis of highly magnetic iron nanoparticles suitable for field structuring using a β-diketone surfactant," Journal of Magnetism and Magnetic Materials, vol. 278 (2004) pp. 311-316. In this work, the size of nanoparticles is controlled kinetically by varying the amount of iron pentacarbonyl precursor added to a solution of pentanedione in dioctyl ether over a fixed reaction period (one hour) followed by continued reaction time at elevated temperature after cessation of the addition of the iron precursor. Iron nanoparticles of 3 nm and 6 nm diameter were grown by quadrupling the amount of added iron. This is a kinetically controlled process that does not lend itself readily to implementation in large-scale production using a continuous reactor.

BRIEF DESCRIPTION OF THE DRAWINGS

The accompanying drawings, which are incorporated in and form part of the specification, illustrate some embodiments of the present invention and, together with the description, serve to explain the principles of the invention.

DETAILED DESCRIPTION OF THE INVENTION

This invention comprises a method of controlling the size of chemically synthesized magnetic nanoparticles that employs magnetic interaction between particles to control particle size and does not rely on conventional kinetic control of the reaction to control size. The particles are caused for reversibly agglomerate and precipitate from solution; the size at which this occurs can be well controlled to provide relatively monodisperse particle size distributions. The size of particles is controllable by the size of the surfactant employed in the process; controlling the size of the surfactant allows magnetic control of the agglomeration and precipitation processes. Replacement of the surfactant used during synthesis with a longer surfactant allows reversal of the agglomeration process. Agglomeration is used to effectively stop particle growth and determine the particle size.

Interactions between magnetic particles depend upon the ratio between the interparticle spacing and the particle radius. When synthesizing magnetic nanoparticles, the conventional approach is to employ a nucleation and growth process using a surfactant to prevent agglomeration. During the course of a reaction, the minimum particle spacing is limited by the size of the surfactant passivating the surface; the particle size continually increases during conventional processes.

The present invention employs a means of controlling particle size that does not depend simply on the kinetics of the reaction. Control is based on a thermodynamic equilibrium state rather than purely upon kinetics. The reaction process employs fast nucleation followed by slow growth. The mode of termination of the growth in size of the nanoparticles is different from that in conventional nanoparticle formation processes. In conventional processes, the reaction is terminated kinetically by total consumption of one of the reactants or by some deliberate change in reaction conditions, such as cooling the reaction solution. This invention, in contrast, halts the growth of a particular set of nanoparticles by the reversible magnetic agglomeration that leads to the unavailability of that set of particles to undergo further reactions that will increase their size.

Figure 1A:
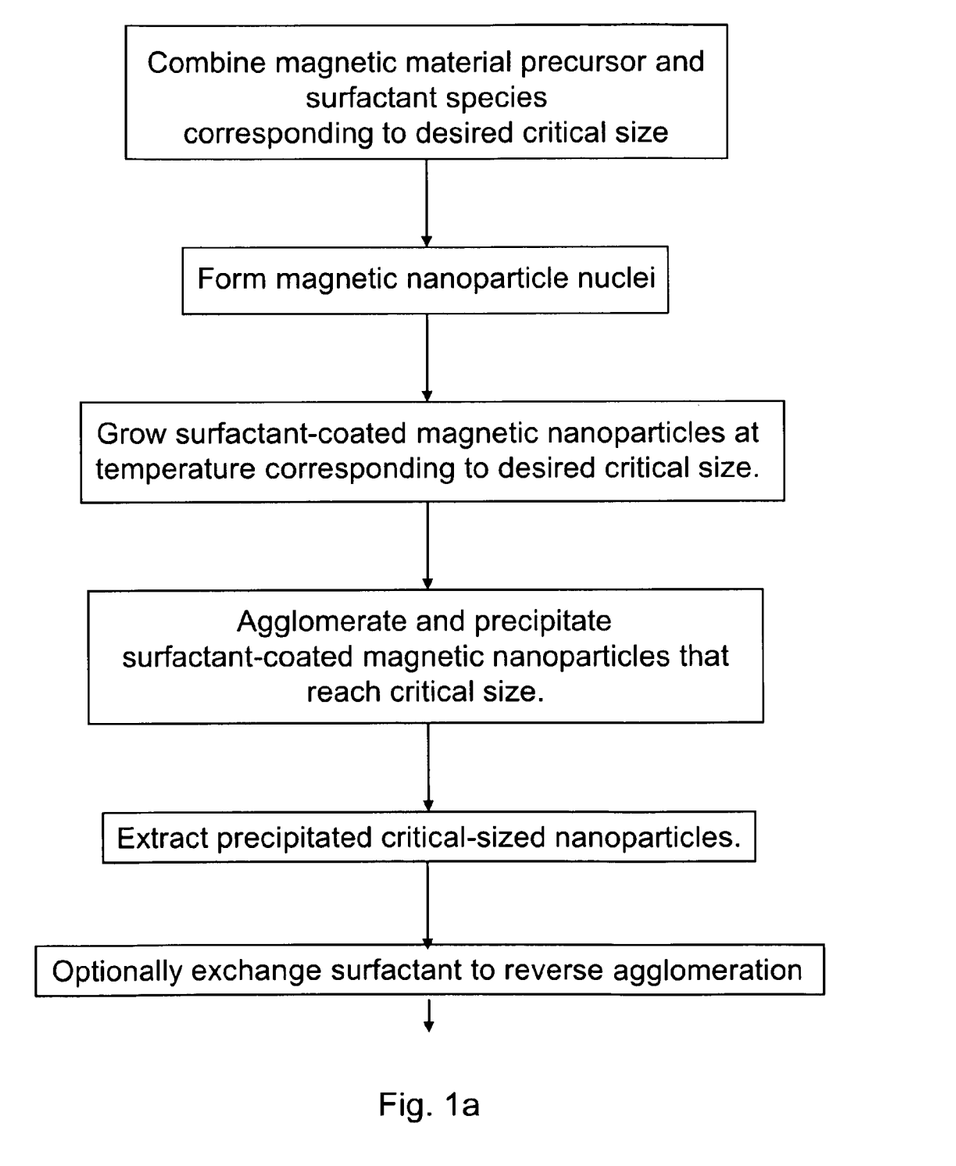
FIGS. 1a and 1b schematically present some embodiments of the invention.
Figure 1B:
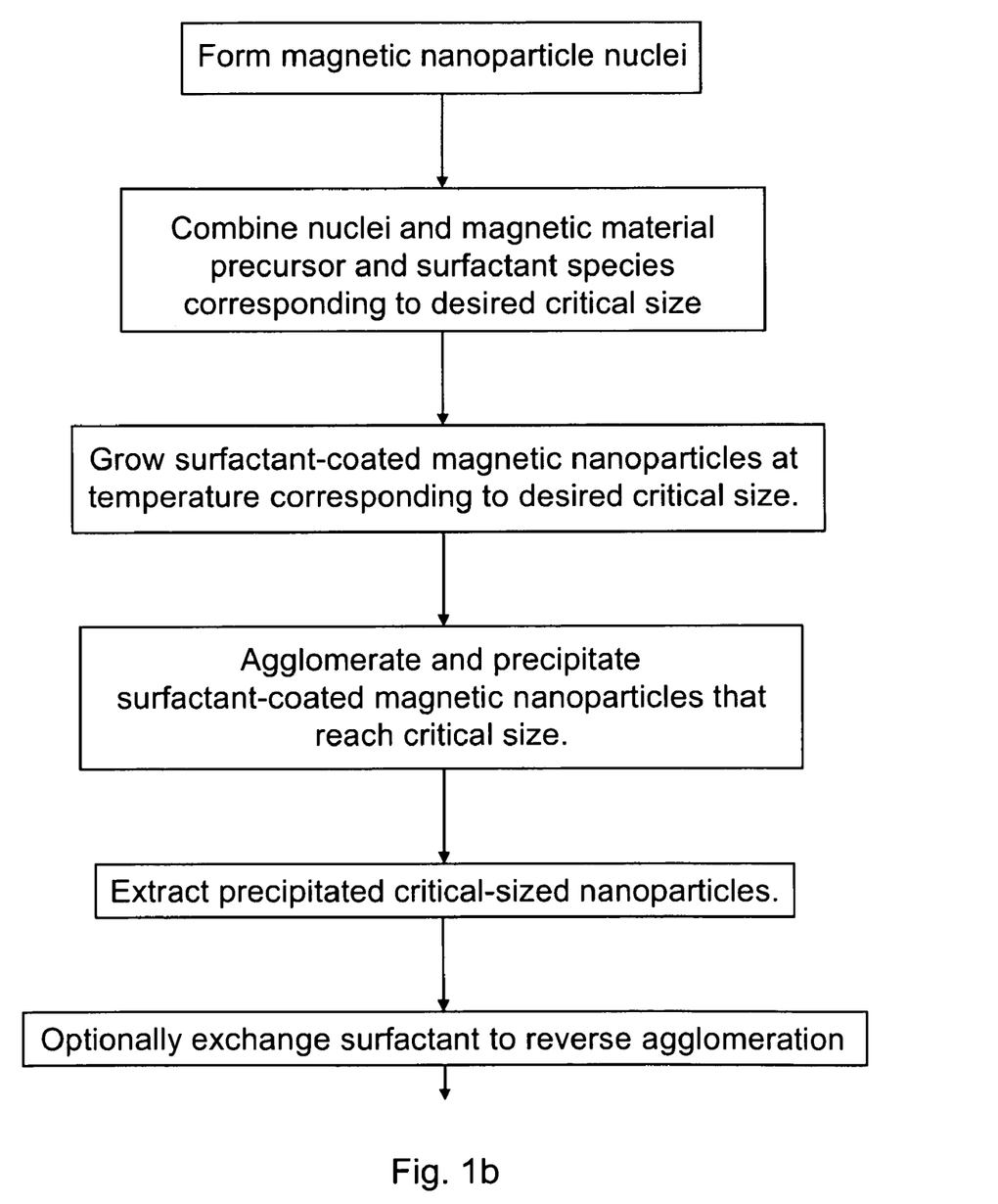

Dipolar interparticle interactions grow rapidly with increasing particle size and at some critical size, which depends upon the interparticle spacing, the particles magnetically agglomerate. In embodiments of this invention, the minimum interparticle spacing is controlled by the size of the particular surfactant species that is employed. This agglomeration can occur very suddenly, producing precipitation of particles of this critical size. These precipitated particles no longer participate at appreciable rates in the solution chemical reaction, so their size is substantially fixed. Chemical reaction continues in the solution above the particles to again generate particles that increase in size until reaching the same critical size, upon which they also agglomerate and precipitate. The spontaneous agglomeration and precipitation of particles when they reach critical size makes this approach to nanoparticle synthesis highly amenable to implementation in a continuous process reactor, since the nanoparticles continuously remove themselves from solution upon reaching critical size. This is in sharp contrast to conventional kinetic control of size that employs changes in reactant supply or temperature to halt nanoparticle growth. The need for such changes in conditions make such kinetically controlled processes less suitable for continuous reaction modes of implementation. Because of the control mechanism, nanoparticles of a very narrow polydispersity can be obtained with this present process. The size can be controlled and varied by varying the size of the surfactant employed in the reaction. Particle size can also be controlled by varying the reaction temperature. FIGS. 1a and 1b represents schematically some embodiments of the invention where the surfactant that allowed agglomeration is exchanged for a different surfactant of greater length that leads to unagglomeration of the nanoparticles.

An understanding of the physical processes that are operative in various embodiments of this invention allows one to select a set of process parameters that will produce the desired critical particle size for a particular material. The embodiments of the present invention employ the size-dependent susceptibility of a magnetic nanoparticle. The susceptibility of a superparamagnetic nanoparticle in the absence of strong magnetic fields can be estimated by the equation $$\chi_p = \tfrac{1}{3}(\mu_0 m_p M_p / k_B T) \qquad \text{Eqn. 1}$$

where $\chi_p$ is the particle susceptibility, $\mu_0$ is the permittivity of vacuum, $m_p$ is the particle moment, $M_p$ is the particle magnetization, $k_B$ is the Boltzmann constant, and $T$ is the absolute temperature. Since $m_p$ is equal to the magnetization times the particle volume, the susceptibility depends directly on the particle volume. This leads to a radius-cubed dependency. This equation for susceptibility accounts for the susceptibility of the magnetic core. For the interaction between neighboring nanoparticles, the effect of the passivating surfactant shell is also to be considered. The presence of the surfactant changes the appropriate equation to $$\chi_p = \tfrac{1}{3}(\mu_0 m_p M_p / k_B T)(r^3/(r+r_s)^3) \qquad \text{Eqn. 2}$$

where r is the radius of the magnetic core of the particle, and $r_s$ is the addition to the particle radius due to the surfactant shell. The dependence of the susceptibility upon the magnetic core radius is changed by the presence of the size of the surfactant. This provides a degree of control based on surfactant size.

One can use Eqn. 2 to calculate approximate particle susceptibilities for any magnetic material and surfactant combination. The demonstrated embodiments of this invention employ iron or magnetite particles using a pentanedione or substituted pentanedione surfactant, but other embodiments of this invention can employ other magnetic core materials and other surfactants as they will have their own critical susceptibility that enables the mechanism of this invention to be operatively applied.

Figure 2:
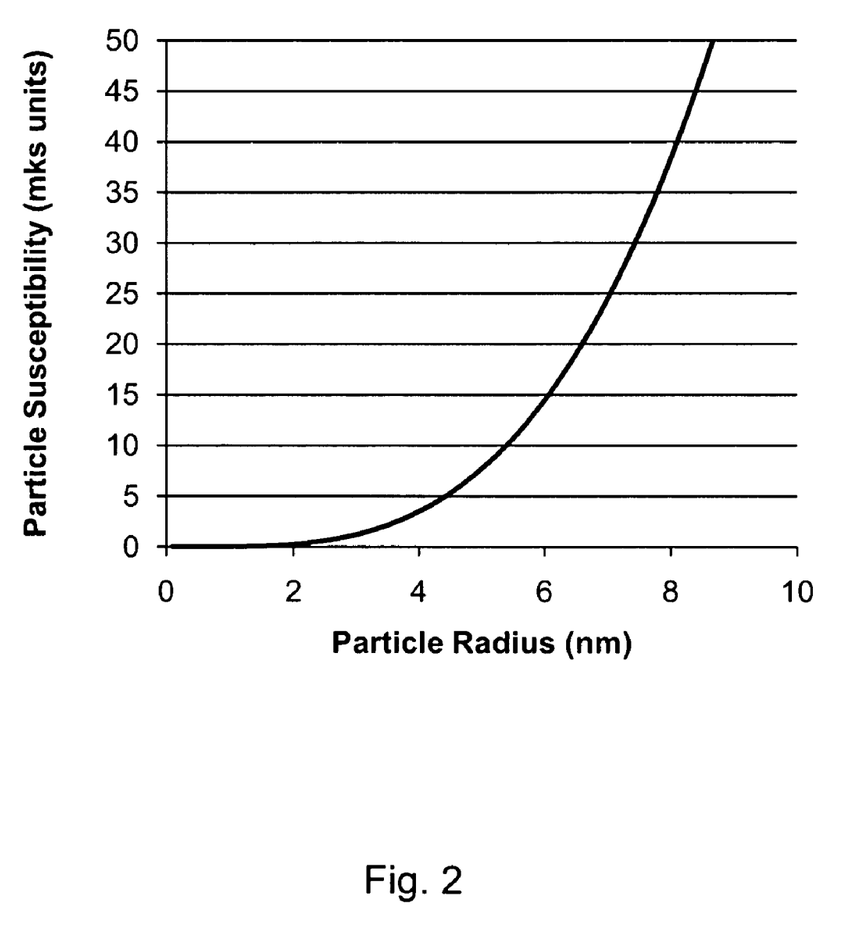
FIG. 2 presents the dependence of particle susceptibility on particle radius for iron nanoparticles being grown with a 1-nm-long surfactant.

The dependence of the susceptibility upon particle size can be calculated, and one such calculation is illustrated in FIG. 2 for iron nanoparticles grown with 1-nm long surfactants. A particle magnetization value of $6.3 \times 10^5$ A/m was used. A value below that of bulk iron ($1.7 \times 10^6$ A/m at 0 K) was used; the lower value is reasonable based on the small size of the nanoparticles and the elevated temperature of 200° C., both being factors that significantly decrease magnetization.

When the susceptibility of magnetic nanoparticles is greater than a critical value, the particles begin to agglomerate. FIG. 2 illustrates how a very small particle, such as would be present shortly after nucleation, has a very small susceptibility. For example, for a critical susceptibility of 5 in mks units, the susceptibility grows rapidly with increasing particle size, and for the parameters of this calculation, reaches the approximate critical susceptibility at a radius of about 4.5 nm. For the purpose of illustration in this specification, a critical susceptibility of 5 will be used in calculations that illustrate the effect of different reaction parameters on the process and provide reasonable agreement with observed behaviors. It is to be understood that the critical susceptibility for precipitation may be different from 5, depending on the materials and conditions of reaction. The critical susceptibility of approximately 5 was determined for particles where the non-magnetic interactions were sufficiently small as to be treated as negligible. If this is not the case, the critical susceptibility may vary somewhat from this value. However in most cases, using the number 5 will provide an acceptably accurate calculation When the growing particles reach the critical susceptibility, they particles agglomerate and rapidly precipitate. This precipitation makes them substantially unavailable for further reaction, as the diffusion of reagents through a precipitated solid is negligibly slow. Thus, even though more reactant material may be available in solution for reaction, the particles that reach the critical size are removed from solution and no longer react significantly with the solution-phase reactants. Consequently, for a particular magnetic material, surfactant length, and reaction temperature, there will be a very narrow size range of particles that can be repeatably synthesized and precipitated without the necessity of establishing tight control of the reaction kinetics.

As the nanoparticles reach their critical size and precipitate, the nanoparticle-forming reaction can continue in the supernate solution. Nucleation of a new ensemble of particles occurs, and the particles of this new ensemble grow until they, too, reach the critical size, where they then also precipitate. This reaction sequence of nucleation, growth to critical size, and agglomeration and precipitation can be repeated for an arbitrary number of cycles as long as appropriate nanoparticle growth conditions are maintained to produce arbitrarily large quantities of nanoparticles, which are all of substantially the same size. Appropriate growth conditions can be maintained by, for example, appropriate additions of nanoparticle precursor and surfactant to compensate for the material removed from solution through precipitation.

The magnetic properties of the magnetic core have a major effect in determining the critical size where reversible agglomeration occurs. The material's magnetization appears in Eqn. 1 as $M_p$, but $m_p$ also depends directly upon the material's magnetization. This results in a second-order dependence of the susceptibility on the material's magnetization. Consequently, the magnetic properties of the core material have a very large effect on the critical particle size. For example, for magnetite at 200° C. with a magnetization of $1.0 \times 10^5$ A/m, one would calculate a critical radius for the conditions in FIG. 2 of 13.3 nm, compared to a critical radius of 4.5 nm for iron in the figure.

The magnetizations of many magnetic materials are known for the bulk state. Nanoparticles can have quite different magnetizations than their corresponding bulk values, often being considerably lower. Magnetic nanoparticles also tend to have a stronger dependence of their magnetic properties upon temperature than bulk material, so temperature can have a strong effect on the critical size for nanoparticles of a given material. For assistance in determining a set of reaction conditions to provide a desired particle size, the magnetization of nanoparticles of approximately the desired size can be determined using such readily available measurement apparati as vibrating sample magnetometers or superconducting quantum interference device (SQUID) magnetometers.

Figure 3:
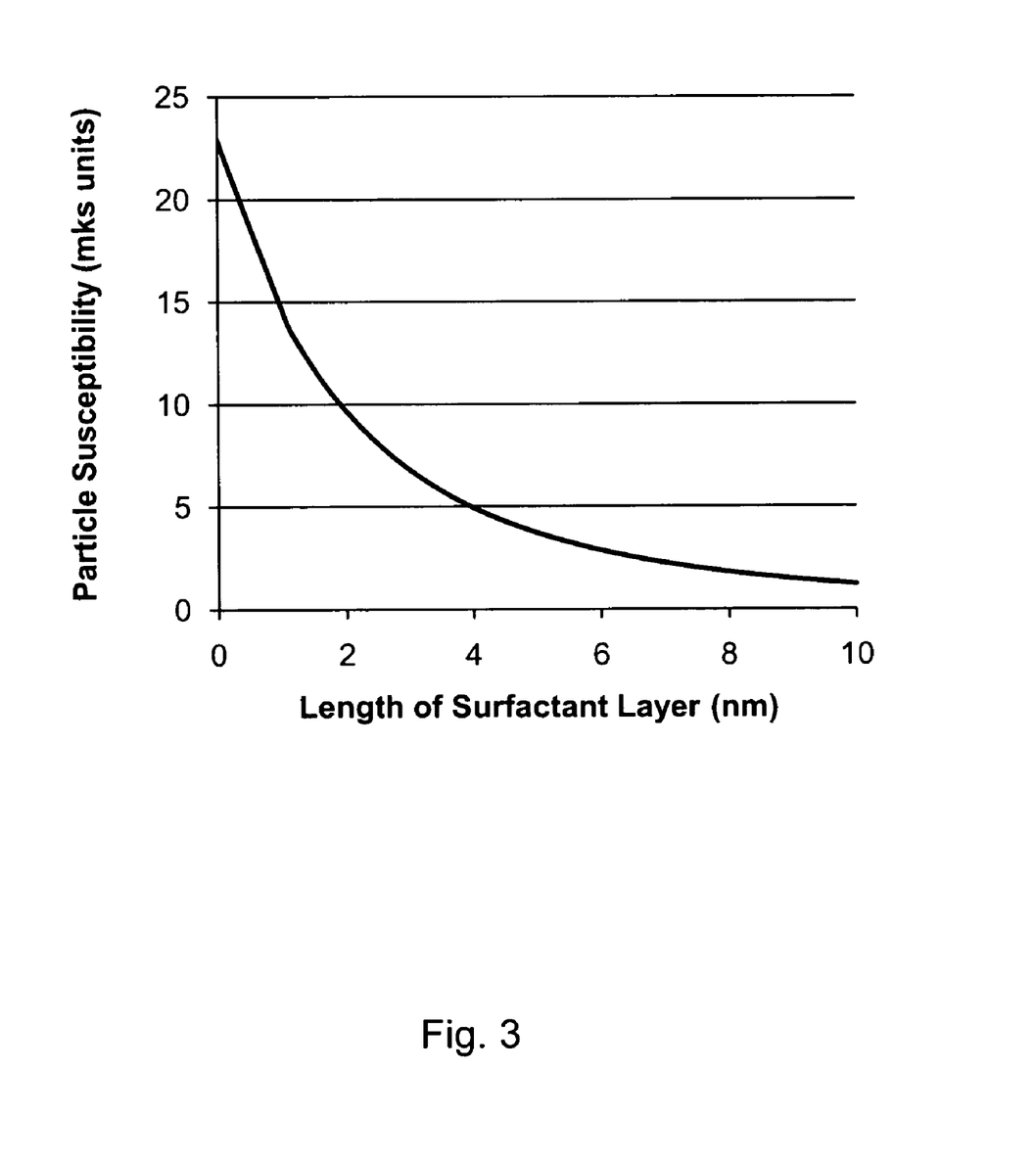
FIG. 3 presents the dependence of particle susceptibility on surfactant length for iron nanoparticles with a 6-nm radius.

The effect of surfactant size in controlling particle size is illustrated in FIG. 3 for a 12-nm core iron nanoparticle using the same parameters employed in FIG. 2. For a given material, surfactant length has a strong effect on particle susceptibility. The dependence of susceptibility on surfactant length is third-order, so the effect of surfactant length is pronounced. For the 12-nm-core particles, a surfactant length of approximately 3.9 nm will cause the particles to reach a susceptibility of 5.

Figure 4:
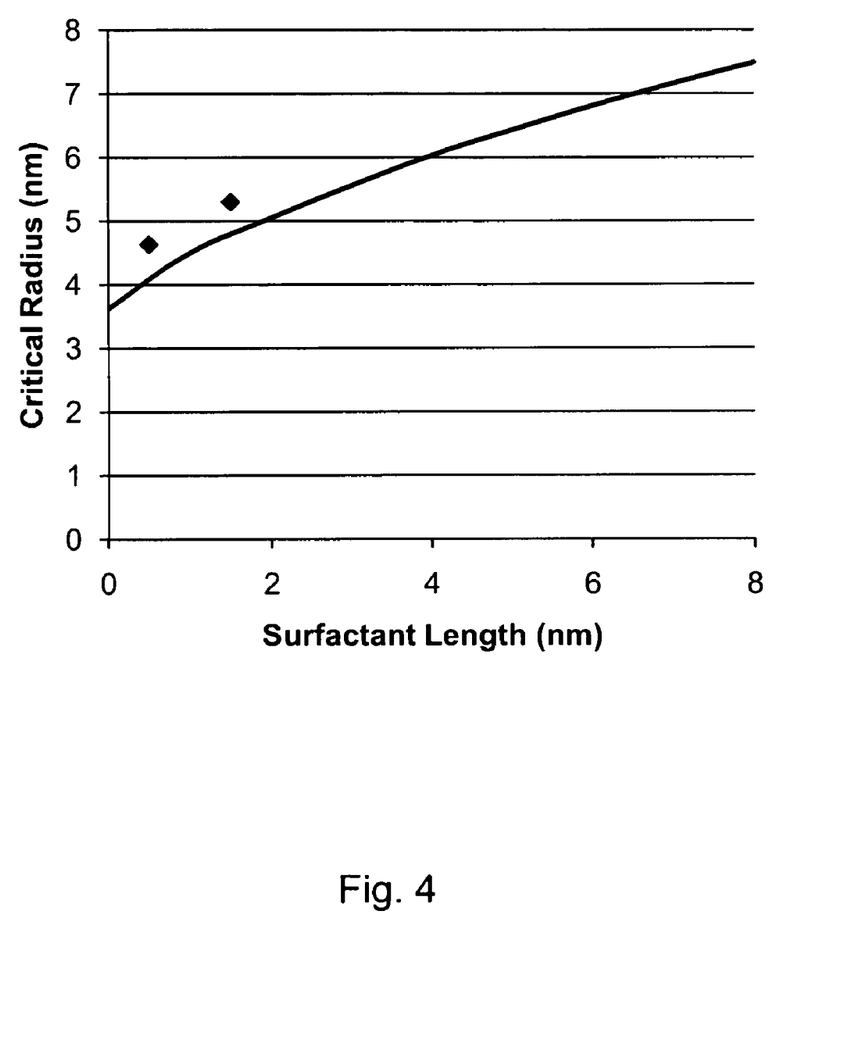
FIG. 4 present the relationship between critical radius of iron nanoparticles and surfactant length. The data points correspond to TEM measurements of iron nanoparticles bound to 2,4-pentanedione (at approximately 0.5 nm surfactant) and 3-decyl-2,4-pentanedione (at approximately 1.5 nm surfactant).

As an example, assuming a critical susceptibility of 5, an iron core, and a reaction temperature of 200° C., the critical particle radius is plotted versus surfactant length in FIG. 4 It is clear that a range of superparamagnetic nanoparticles sizes can be formed by selecting the appropriate surfactant length. Depending upon the desired particle size, surfactant lengths greater than or equal to approximately 0.5 nm and less than or equal to approximately 20 nm may be used. The exception to this is for very small nanoparticles, where appropriately sized surfactants may not be available. For example, for nanoparticles with the properties used in calculating the curves of FIGS. 2 and 3, iron particles 3.6 nm and smaller have susceptibilities less than the assumed critical value of 5 even without a surfactant shell. However, particles of this size may be made of other materials with higher magnetization values or at lower temperatures.

FIG. 4 illustrates the critical radius of an iron-core particle vs. the surfactant length assuming a critical susceptibility of 5. The true critical susceptibility may differ from 5 by a few percent, but 5 provides a useful starting value. The size of iron particles measured with TEM using 2,4-pentane-dione and 3-decyl-2,4-pentaindione surfactants are plotted on the graph. The slight disagreement between experiment and calculation may be attributed to approximations and assumptions made in equation 2, coupled with uncertainties in the determination of particle sizes by TEM.

Figure 5:
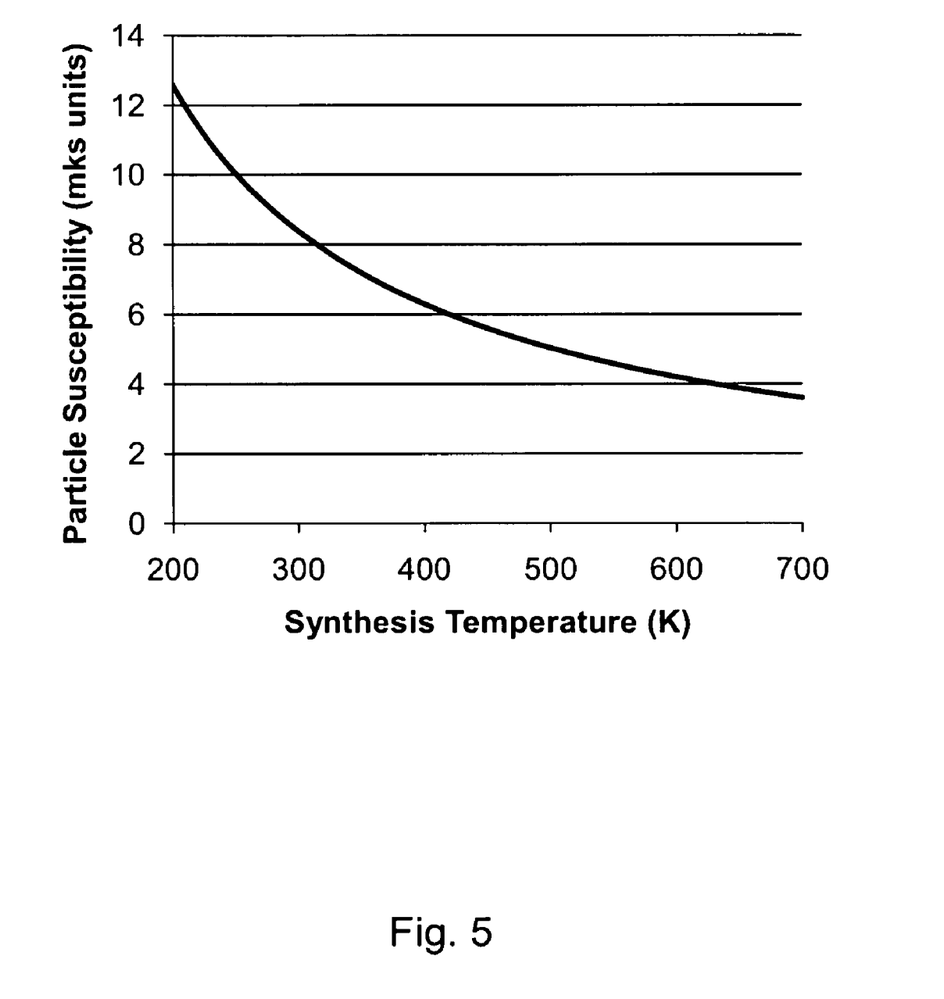
FIG. 5 presents the dependence of particle susceptibility on reaction temperature for a 9-nm iron particle.
Figure 6:
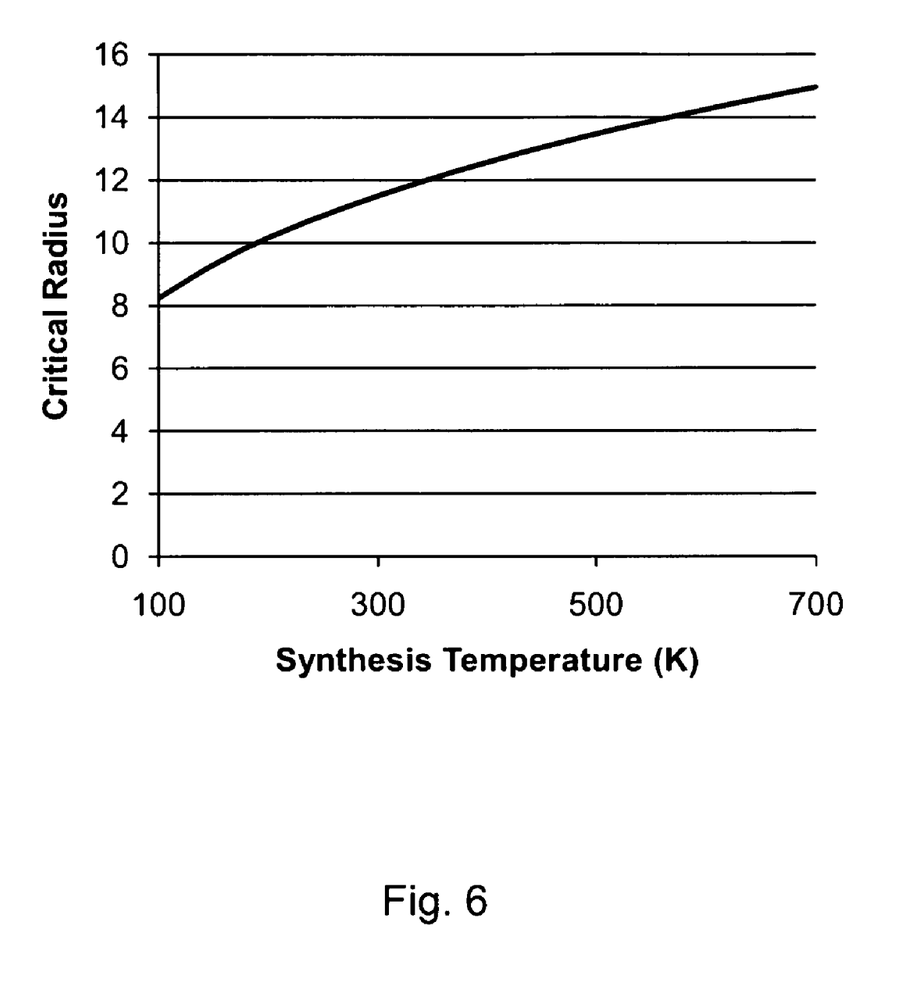
FIG. 6 presents the relationship between critical radius and reaction temperature for iron nanoparticles grown with a 1-nm surfactant.

The temperature dependence of the susceptibility can be used to control particle size. There is a reciprocal dependence of susceptibility on temperature, as shown in Eqn. 2. This dependence is illustrated for iron particles of 4.5-nm diameter in FIG. 5. Assuming a critical susceptibility of 5, particles of approximately 4.5-nm critical radius should form near 500 K. This is consistent with the approximately 9-nm-diameter nanoparticles that have been synthesized at 200° C. with pentanedione surfactant. At room temperature, particles of this size would have a susceptibility of approximately 8. For a critical susceptibility of 5, one would expect agglomeration/precipitation of particles of approximately 3.9-nm radius. FIG. 6 illustrates the critical radius of the magnetic iron-core nanoparticles versus reaction temperature assuming a critical susceptibility of 5.

Precise knowledge of the critical susceptibility is not essential to the practice of this invention. A reasonable approximation can be employed for selecting initial reaction conditions. Based upon the size of particles obtained, one of skill can employ the teaching of this invention to determine suitable alteration of reaction parameters to achieve the final desired particle size. The size of particles obtained can be used to derive an appropriate value of critical susceptibility for use in calculations to guide selection of reaction parameters such as surfactant and reaction temperature.

Reversal of the agglomeration process to obtain individual nanoparticles can be achieved by replacing the surfactant with a longer chain surfactant to reduce the susceptibility to a value less than the critical susceptibility. For example, if nanoparticles have been agglomerated and precipitated while bound to a pentanedione surfactant, exchanging the pentanedione molecules for oleic acid molecules will lead to resuspension of the individual nanoparticles.

In one embodiment, a solution of 2.2 mL of dioctyl ether and 0.02 mL of pentanedione were placed under a nitrogen atmosphere. The solution was heated to 200° C. A solution of iron pentacarbonyl (220 mM) and pentanedione (3 mM) in dioctyl ether was slowly added (at a rate of 2 mL per hour). The reaction was allowed to proceed under a flow of nitrogen for an additional 30 minutes. Care was taken during the synthesis to avoid introduction of oxygen since iron particles are very easily oxidized.

Figure 7:
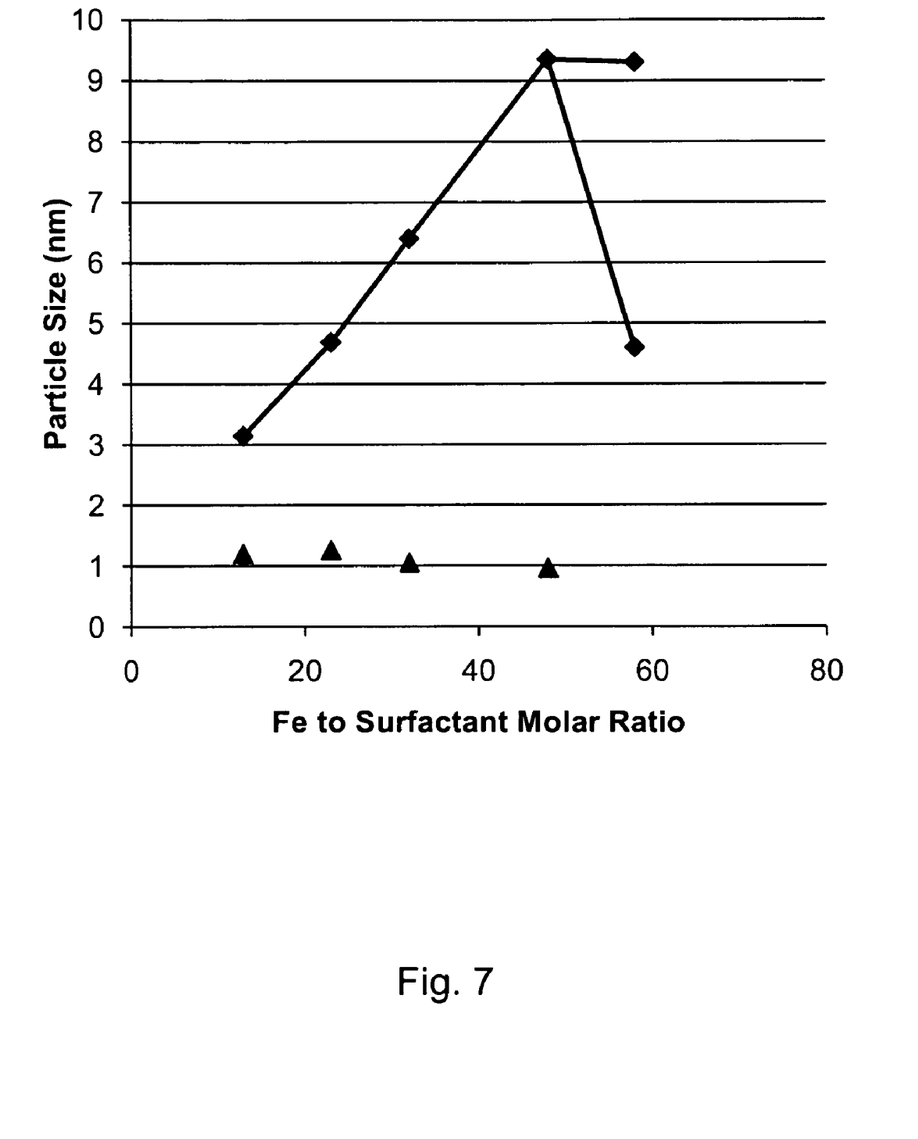
FIG. 7 presents the size of nanoparticles as determined using transmission electron microscopy (TEM) as a function of the amount of iron added the reaction mixture, expressed in terms of the iron-to-surfactant molar ratio. Particles with sizes less than the critical size were extracted from the solution. Critical-sized particles were precipitated. The bimodal values at the upper molar ratio represents both critical-sized precipitated particles and smaller particles that were still in solution. The standard deviation at each molar ratio is indicated by the corresponding triangles.
Figure 8:
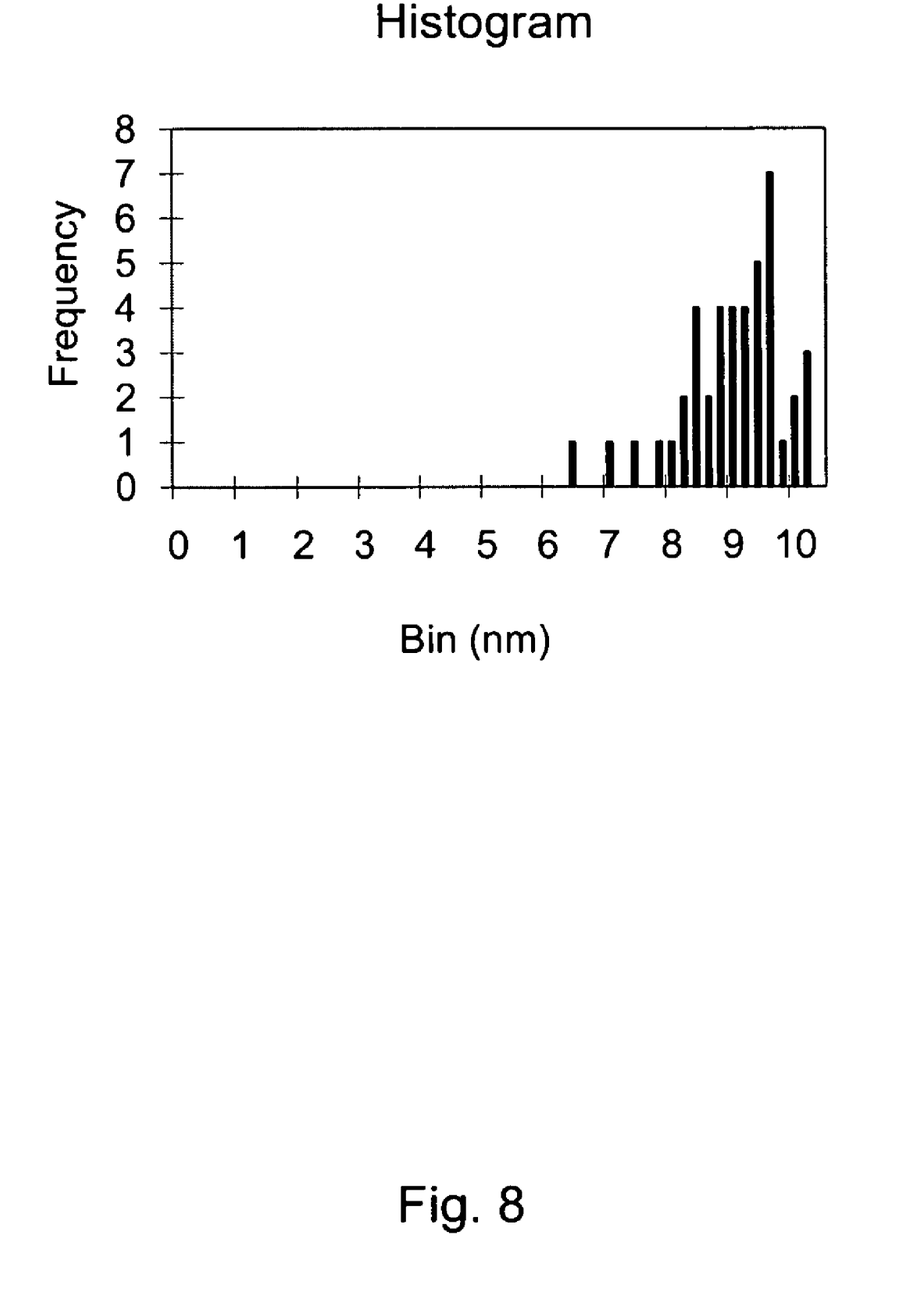
FIG. 8 represents a histogram of particles diameters from the 48:1 Fe:surfactant particles shown in FIG. 7. The diameters were determined by TEM. Bin number corresponds to particle diameter.
Figure 9:
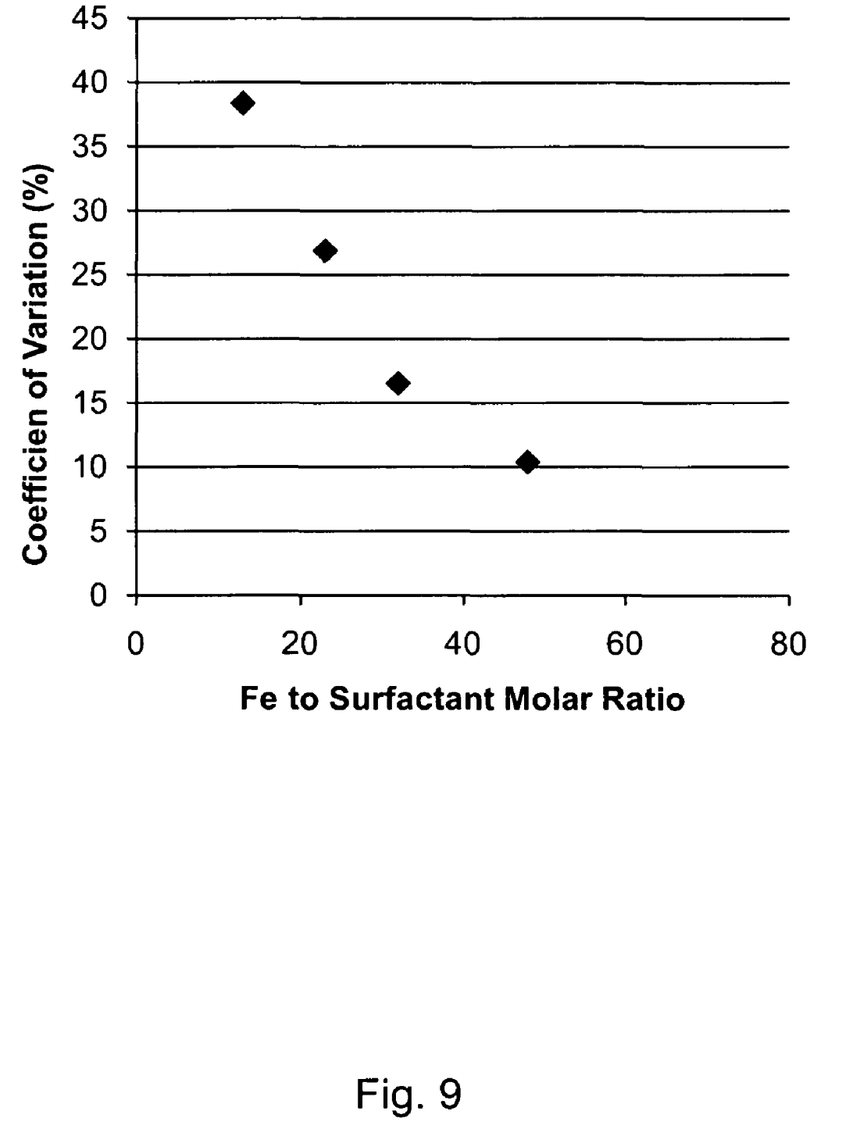
FIG. 9 represents the coefficient of variation for the particles represented in FIG. 7.

Several reactions were performed with varying precursor injection times at constant injection rates to provide variation in the mole ratio of surfactant to iron precursor. FIG. 7 illustrates the relationship between iron particle size and the amount of surfactant present, presented as a molar ratio that changes as more iron precursor is added to the reaction solution. The solution turns black as the nanoparticles form. Aliquots are withdrawn using standard air-free techniques for analysis of the size of particles present in the solution. The initial data point shows that nucleation of nanoparticles has begun, and the average size of particles in the solution grows steadily with the addition of more iron pentacarbonyl until a nanoparticle diameter of approximately 9.3 nm is reached. At that point, the black solution became almost completely clear as a black precipitate forms at the bottom of the reaction vessel. FIG. 8 presents a histogram showing the frequency of occurrence of different particle sizes corresponding to the 48:1 Fe-to-surfactant molar ratio in FIG. 7. The coefficients of variation (%) for the particles presented in FIG. 7 are presented in FIG. 9. As the iron particles grow with the addition of more iron and approach the critical size where agglomeration and precipitation occur, the variation in particle size narrows. With the addition of additional iron carbonyl, the solution again darkens as additional small nanoparticles form in solution. At the last mole ratio illustrated, a bimodal distribution of particle sizes is obtained, where the approximately 9.3-nm-nanometer nanoparticles are the precipitated nanoparticles and the approximately 4.5-nm-diameter particles are those that were suspended in the solution. The large nanoparticles retained the size they had upon precipitation and a new population of nanoparticles as been formed in solution that have not yet grown to the size that produces precipitation. In embodiments of this invention, particle growth is stopped abruptly at a particular size designated a critical size and particles remain substantially at that same size while new particles can be grown in the supernate solution without significant interference from the precipitated particles. Continued addition of iron precursor allows repeated cycles of growth in size of nanocrystals, precipitation at the critical size for the particular temperature and surfactant, growth of in size of another set of nanocrystals, precipitation of the second set of nanocrystals upon reaching the critical size, and so forth. The size of the nanocrystals is not kinetically controlled, in contrast to the kinetic control of most nanoparticle synthetic methods.

In another embodiment, a solution of 2 mL of dioctyl ether and 0.0225 mL of 3-decyl-2,4-pentanedione were placed under a nitrogen atmosphere. The solution was heated to 200° C. A solution of iron pentacarbonyl (0.4 mL) and 3-decyl-2,4-pentanedione (0.0225 mL) in dioctyl ether (1.6 mL) was slowly added (at a rate of 2 mL per hour). The reaction was allowed to proceed under a flow of nitrogen for an additional 30 minutes. Care was taken during the synthesis to avoid introduction of oxygen since iron particles are very easily oxidized. The iron particle diameter, as determined by TEM, was approximately 10.6 nm.

In another embodiment, magnetite particles were grown. In this embodiment, magnetite was synthesized through the thermal decomposition of iron acetylacetonate in refluxing octadecene. In this reaction the metal precursor also provides the surfactant, since it releases pentadione when it decomposes. A solution of iron acetylacteonate (0.7 g) in octadecene (20 mL) was heated to reflux under a nitrogen atmosphere. The reaction was heated for approximately 4 hours until the dark solution became translucent. Nanoparticles were collected from the precipitate that had formed.

A wide range of metal precursors can be used in embodiments of this invention. Some examples include but are not restricted to metal carbonyls, metal acetylacetonates, metal acetates, metal alkanoates, metal alkoxides, metal amides, and metal amidates.

A wide range of temperatures and surfactant conditions may be used. Temperatures between approximately 100 and 650 K may be used. Surfactant concentrations between 0.1 and 20% by mass and surfactant sizes from approximately 0.5 to approximately 20 nm may be used. The size of magnetic particles that agglomerate and precipitate under a particular set of reaction conditions is related to the size (length) of the surfactant, as described in greater detail herein.

Because the process of agglomeration and precipitation is controlled by a physical property of the nanoparticles, namely by the magnetic susceptibility, rather than specifically by a chemical property of a particular nanoparticle composition, the method of this invention has extremely wide application to a very wide range of magnetic materials. Consequently, magnetic nanoparticles of precisely controlled size with a very narrow variation in size from a particular reaction can be made from many different magnetic materials. Examples of magnetic materials that are suitable for having nanoparticles made by this process include but are not restricted to iron, cobalt, nickel, chromium, manganese, cerium, neodymium, samarium, europium, gadolinium, terbium, dysprosium, holmium, erbium, thulium, and magnetic alloys and magnetic compounds thereof.

A wide range of solvents may be employed in various embodiments of this invention. The solvent may be selected using considerations of the temperature at which the reaction is to be conducted, and the solubility of the metal precursor species and the surfactant. Dioctyl ether and octadecene were employed in the embodiments described above, but many other high-temperature solvents would also be suitable for use. Some other useful high temperature solvents include but are not restricted to high molecular weight alkanes, alkenes, ethers, esters, and fatty acids. In addition to the examples above, other specific examples of these include octadecane, hexadecene, diphenyl ether, cottonseed or other natural oils, and numerous commercially available waxes.

Figure 10:
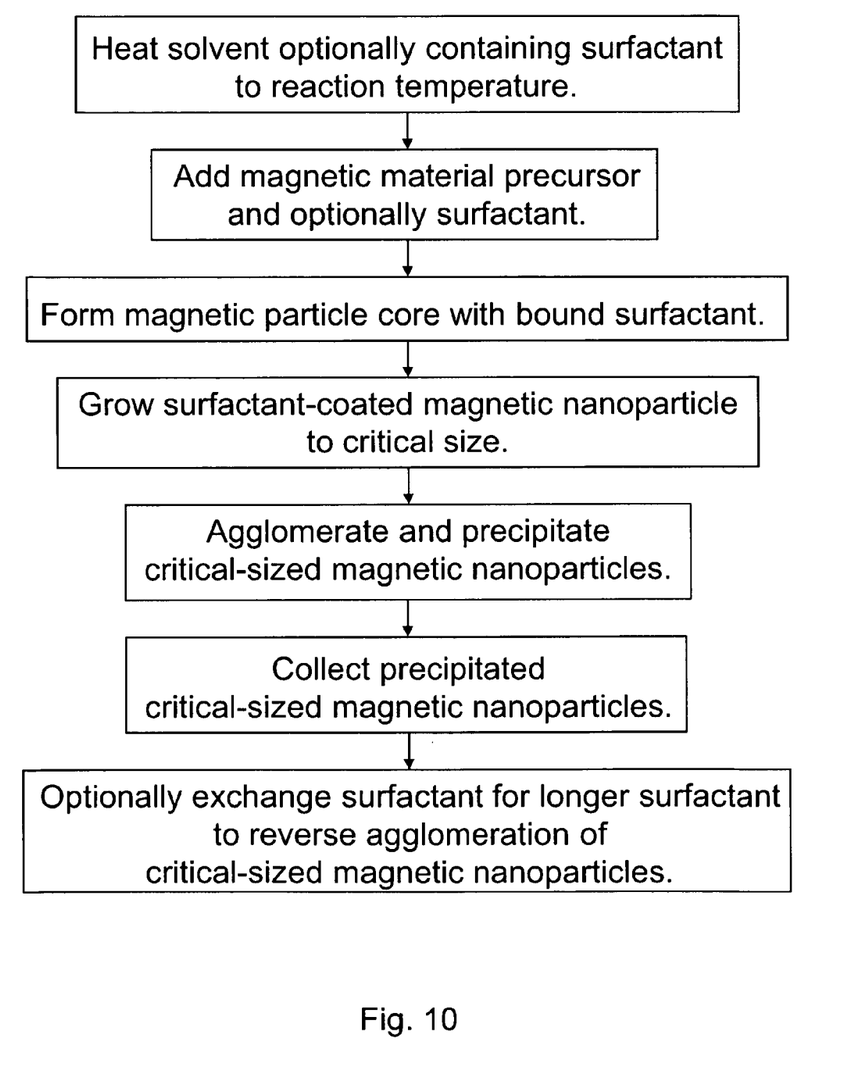
FIG. 10 presents an embodiment employing a batch reaction system.

Because the property of a surfactant that determines the critical size of nanoparticle that can form is a physical property, that is, the length of the surfactant, a very wide range of compounds can be used as the surfactant in embodiments of this invention. Examples of types of surfactants that can be used include but are not restricted to alkanes, alkenes, aromatics, alkynes, alcohols, thiols, phosphines, amines, amides, carboxylic acids, phosphonic acids, ketones, aldehydes, esters, diketones, ammonium salts, ethers, polyethers, thioethers, polythioethers, silanes, alkoxy silanes, and silicones. The effective length of the surfactant suitable for growing nanoparticles of a particular critical size dictates which particular surfactant species one would employ to the desired nanoparticles. This process can be implemented in a batch reactor system. One can determine the appropriate time for halting the reaction and collecting the agglomerated and substantially monodisperse nanoparticles by observing when the solution clears. FIG. 10 present one embodiment of the invention using a batch reactor apparatus.

Figure 11:
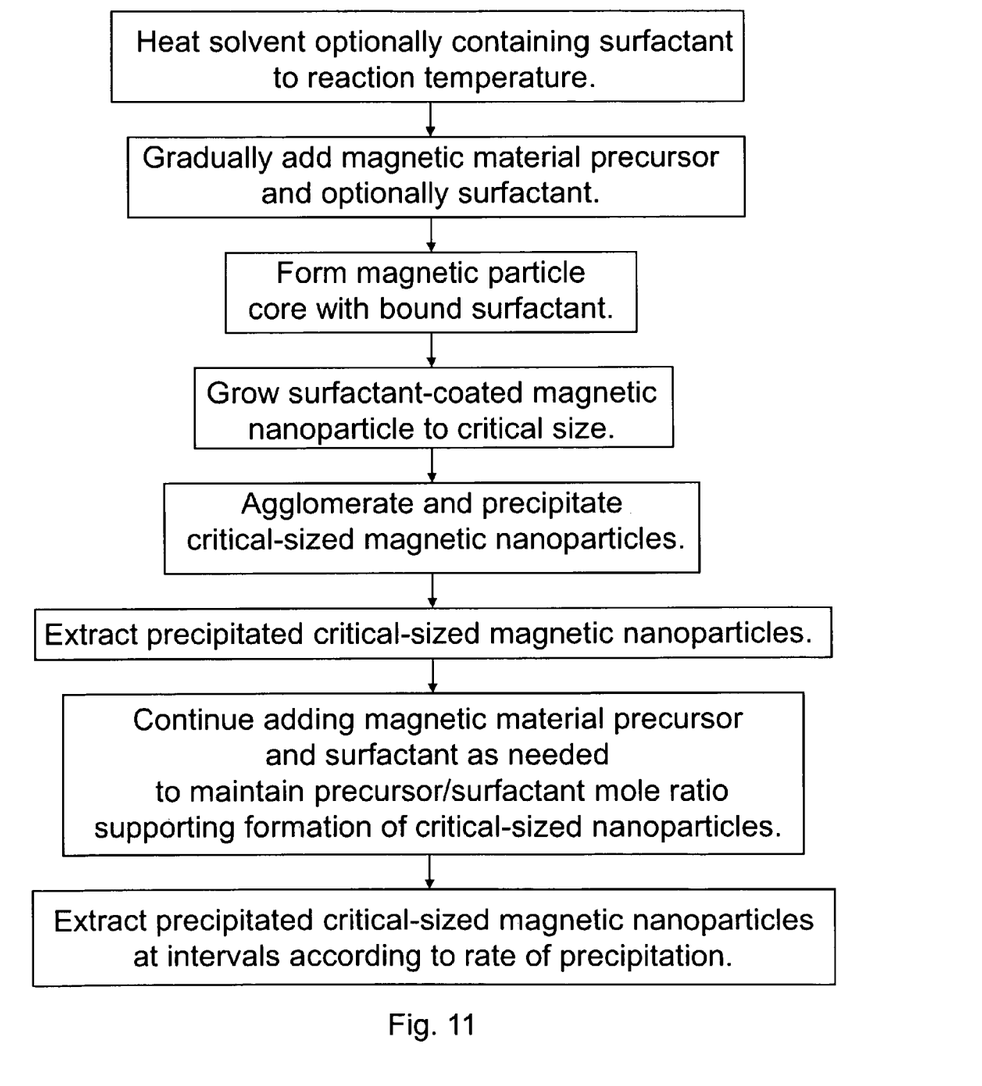
FIG. 11 presents an embodiment employing a continuous reaction system.

It can also be implemented in a continuous reactor system where precursors are added to the solution at an appropriate rate and where the precipitated nanoparticles are withdrawn from the bottom of the reactor. The spontaneous agglomeration and precipitation of the nanoparticles upon reaching a particular size produces a substantially cyclic nature to the process, where particles grow in size until reaching the agglomeration size and then precipitate out of solution. Addition of more reactant starts the cycle over with very small nanoparticles forming in the supernate and then growing until they, too, reach the agglomeration size and precipitate. The continuous reactor can be configured to enable periodic withdrawal of the precipitated particles without interruption of the reaction process. While agglomeration and precipitation of nanoparticles often require cooling of the reaction solution to occur, embodiments of this present invention do not require any appreciable reduction in temperature to allow formation and collection of the precipitated product. FIG. 11 presents one embodiment of the invention using a continuous reactor apparatus.

The fundamentally physical character of the mode of operation of various embodiments of this invention makes it predictably applicable to a very wide variety of magnetic materials with widely divergent chemical characteristics.

The foregoing description of the invention has been presented for purposes of illustration and description and is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for making magnetic nanoparticles, comprising:
    combining a magnetic material precursor and a first surfactant species to form a reaction solution;
    reacting the magnetic material precursor at a reaction temperature to form a magnetic particle core at least partially coated with the first surfactant species to form a surfactant-coated magnetic nanoparticle;
    growing the surfactant-coated magnetic nanoparticle to a critical size resulting in a critical susceptibility of the surfactant-coated magnetic nanoparticle to produce a critical-sized magnetic nanoparticle capable of spontaneously agglomerating at the reaction temperature;
    agglomerating a plurality of the critical-sized magnetic nanoparticles to form agglomerated critical-sized magnetic nanoparticles; and
    precipitating the agglomerated critical-sized magnetic nanoparticles to form precipitated magnetic nanoparticles.

2. The method of claim 1, further comprising extracting the precipitated magnetic nanoparticles.

3. The method of claim 2, wherein the step of extracting is conducted while continuing at least one of the steps of reacting to form the magnetic particle core and growing the surfactant-coated magnetic nanoparticle to the critical size.

4. The method of claim 1, further comprising nucleating and growing an additional magnetic particle core during or after agglomerating the plurality of critical-sized magnetic nanoparticles.

5. The method of claim 1, wherein oxygen is substantially excluded from the reaction solution.

6. The method of claim 1, further comprising reversing agglomeration of the critical-sized magnetic nanoparticles by exchanging the first surfactant species with a second surfactant species with a greater molecular length than a molecular length of the first surfactant species.

7. The method of claim 1, wherein the magnetic material precursor is selected from the group consisting of metal carbonyls, metal acetylacetonates, metal acetates, metal alkanoates, metal alkoxides, metal amides, and metal amidates.

8. The method of claim 1, wherein the magnetic material precursor is iron pentacarbonyl.

9. The method of claim 1, wherein the magnetic material precursor is iron acetylacetonate.

10. The method of claim 1, wherein the first surfactant species has a molecular length less than or equal to approximately 20 nanometers.

11. The method of claim 1, wherein the first surfactant species is selected from the group consisting of alkanes, alkenes, aromatics, alkynes, alcohols, thiols, phosphines, amines, amides, carboxylic acids, phosphonic acids, ketones, aldehydes, esters, diketones, ammonium salts, ethers, polyethers, thioethers, polythioethers, silanes, alkoxy silanes, and silicones.

12. The method of claim 1, wherein the first surfactant species is selected from the group consisting of 2,4-pentanedione and 3-alkyl-2,4-pentanedione, wherein alkyl comprises between 1 and 18 carbons in an approximately linear chain.

13. The method of claim 1, wherein the first surfactant species has a molecular length between approximately 0.5 and approximately 20 nm.

14. The method of claim 1, wherein the precipitated magnetic nanoparticles comprise a magnetic material selected from the group consisting of iron, cobalt, nickel, chromium, manganese, cerium, neodymium, samarium, europium, gadolinium, terbium, dysprosium, holmium, erbium, thulium, and magnetic alloys and magnetic compounds thereof.

15. The method of claim 1, wherein the magnetic material precursor is iron pentacarbonyl and the first surfactant species is 2,4,-pentanedione or 3-decyl 2,4,-pentanedione.

16. The method of claim 1, wherein the magnetic material precursor is iron acetylacetonate and wherein the first surfactant species is formed by thermal decomposition of acetylacetonate.

17. The method of claim 1, wherein the first surfactant species is formed by reaction of the magnetic material precursor.

18. The method of claim 1, wherein the steps of growing, agglomerating, and precipitating are performed in a continuous reaction apparatus configured for extraction of a solid product during a continuous reaction.

19. The method of claim 1, wherein the steps of growing, agglomerating, and precipitating are performed in a batch reaction apparatus.

* * * * *